(12) United States Patent
Utsugi

(10) Patent No.: US 8,040,389 B2
(45) Date of Patent: Oct. 18, 2011

(54) IMAGE PROCESSING METHOD, IMAGE PROCESSING PROGRAM AND IMAGE PROCESSING APPARATUS FOR DETECTING OBJECT OF AN IMAGE

(75) Inventor: Akihiko Utsugi, Tokyo (JP)

(73) Assignee: Nikon Corporation, Tokyo (JP)

( * ) Notice: Subject to any disclaimer, the term of this patent is extended or adjusted under 35 U.S.C. 154(b) by 378 days.

(21) Appl. No.: 12/309,522

(22) PCT Filed: Jul. 9, 2007

(86) PCT No.: PCT/JP2007/063670
§ 371 (c)(1),
(2), (4) Date: Jan. 22, 2009

(87) PCT Pub. No.: WO2008/013050
PCT Pub. Date: Jan. 31, 2008

(65) Prior Publication Data
US 2009/0303336 A1 Dec. 10, 2009

(30) Foreign Application Priority Data
Jul. 25, 2006 (JP) .................................. 2006-202313

(51) Int. Cl.
*H04N 5/228* (2006.01)
*G06K 9/00* (2006.01)
(52) U.S. Cl. ................. 348/222.1; 348/207.99; 382/118; 382/164
(58) Field of Classification Search .................. 382/118; 348/222.1
See application file for complete search history.

(56) References Cited

U.S. PATENT DOCUMENTS
6,661,907 B2 12/2003 Ho et al.
(Continued)

FOREIGN PATENT DOCUMENTS
JP A-06-133303 5/1994
(Continued)

OTHER PUBLICATIONS

Notification of Reasons for Refusal for corresponding Japanese Patent Application No. 2008-526722, mailed on Nov. 9, 2010 (w/ English translation).

*Primary Examiner* — Ngoc-Yen Vu
(74) *Attorney, Agent, or Firm* — Oliff & Berridge, PLC

(57) ABSTRACT

Chrominance image information is generated based upon input image information. A determination target area to undergo determination of a target object within a determination target image constituted with the chrominance image information is set. An average chrominance value for each of the determination target area and a plurality of peripheral areas set around the determination target area is calculated based upon the chrominance image information corresponding to each area. Color information expressed by the average chrominance value calculated for the determination target area is evaluated to determine whether or not the color information matches a characteristic color defined in advance in correspondence to the target object. A difference between the average chrominance value in the determination target area and the average chrominance values in the peripheral areas is evaluated to determine whether or not the determination target area is an image area separate from the peripheral areas. A decision is made as to whether or not the determination target area contains the target object based upon results of an evaluation indicating whether or not the average chrominance value in the determination target area matches the characteristic color and the result of an evaluation indicating whether or not the determination target area is an image area separate from the peripheral areas.

12 Claims, 8 Drawing Sheets

U.S. PATENT DOCUMENTS

| | | |
|---|---|---|
| 6,681,032 B2 | 1/2004 | Bortolussi et al. |
| 6,697,502 B2 | 2/2004 | Luo |
| 7,035,456 B2 * | 4/2006 | Lestideau ................. 382/164 |
| 7,218,759 B1 * | 5/2007 | Ho et al. ................. 382/118 |
| 7,426,296 B2 * | 9/2008 | Lee et al. ................. 382/165 |
| 7,796,827 B2 * | 9/2010 | Lin ................. 382/260 |
| 7,876,364 B2 * | 1/2011 | Wu et al. ................. 348/223.1 |
| 7,881,505 B2 * | 2/2011 | Schneiderman et al. ..... 382/118 |
| 2008/0019575 A1 * | 1/2008 | Scalise et al. ................. 382/118 |

FOREIGN PATENT DOCUMENTS

| | | |
|---|---|---|
| JP | A-08-063597 | 3/1996 |
| JP | A-2000-048184 | 2/2000 |
| JP | A-2002-049912 | 2/2002 |

* cited by examiner

IMAGE PROCESSING METHOD, IMAGE PROCESSING PROGRAM AND IMAGE PROCESSING APPARATUS FOR DETECTING OBJECT OF AN IMAGE

TECHNICAL FIELD

The present invention relates to an image processing method, an image processing program and an image processing apparatus.

BACKGROUND ART

In an image processing method known in the related art, a person's face in a photographed image is detected by executing face determination processing on a face candidate area, which is an image area containing skin color and has been detected as a face candidate. (See patent reference literature 1).

Patent reference literature 1: Japanese Laid Open Patent Publication No. 2000-48184

DISCLOSURE OF THE INVENTION

Problems to be Solved by the Invention

There is an issue yet to be addressed effectively in the method in the related art described above, in that if the color temperature of the light illuminating the subject is low or there is, for instance, a natural wood wall or the like in the background, a large portion of the image may be detected as a skin-colored area and an image area that does not contain a face may be erroneously detected as a face candidate area.

Means for Solving the Problems

An image processing method according to a first aspect of the present invention comprises: generating chrominance image information based upon input image information; setting a determination target area to undergo determination of a target object within a determination target image constituted with the chrominance image information; calculating an average chrominance value for each of the determination target area and a plurality of peripheral areas set around the determination target area, based upon the chrominance image information corresponding to each area; evaluating color information expressed by the average chrominance value calculated for the determination target area to determine whether or not the color information matches a characteristic color defined in advance in correspondence to the target object; evaluating a difference between the average chrominance value in the determination target area and the average chrominance values in the peripheral areas to determine whether or not the determination target area is an image area separate from the peripheral areas; and making a decision as to whether or not the determination target area contains the target object based upon results of an evaluation indicating whether or not the average chrominance value in the determination target area matches the characteristic color and the result of an evaluation indicating whether or not the determination target area is an image area separate from the peripheral areas.

According to a second aspect of the present invention, in the image processing method according to the first aspect, it is preferable that the target object is a person's face.

According to a third aspect of the present invention, in the image processing method according to the second aspect, it is preferable that information indicating the characteristic color of the target object is color information indicating skin color of the person's face.

According to a fourth aspect of the present invention, in the image processing method according to any of the first to third aspects, it is preferable that a color difference distribution in the determination target area is evaluated based upon the chrominance image information corresponding to the determination target area; and a decision is made as to whether or not the determination target area contains the target object based upon the results of the evaluation indicating whether or not the average chrominance value in the determination target area matches the characteristic color, the results of the evaluation indicating whether or not the determination target area is an image area separate from the peripheral areas and results of an evaluation indicating the color difference distribution.

According to a fifth aspect of the present invention, in the image processing method according to any of the first to fourth aspects, it is preferable that integrated image information is generated by integrating the chrominance image information and the average chrominance value is calculated based upon the integrated image information.

According a sixth aspect of the present invention, in the image processing method according to any of the first to fifth aspects, it is preferable that a ratio of an area within the determination target image, containing color information corresponding to information indicating the characteristic color of the target object, is calculated; and the decision is made by giving more weight to the results of the evaluation indicating whether or not the determination target area is an image area separate from the peripheral areas when the calculated areal ratio is greater.

According to a seventh aspect of the present invention, in the image processing method according to any of the first to sixth aspects, it is preferable that color information expressed by the average chrominance value in the determination target area is evaluated to determine whether or not the color information matches the characteristic color of the target object, based upon an evaluation value obtained by projecting the average chrominance value in the determination target area along a first color space coordinate axis extending along a direction in which variance of sample chrominance values of the characteristic color obtained in advance is minimized and along a second color space coordinate axis perpendicular to the first color space coordinate axis and then converting individual projected values.

According to a eighth aspect of the present invention, in the image processing method according to any of the first to seventh aspects, it is preferable that a first chrominance pixel value is generated based upon an input image and values to be used as second chrominance pixel values, are calculated by projecting the first chrominance pixel value along a first color space coordinate axis extending along a direction in which variance of sample chrominance values of the characteristic color, obtained in advance, is minimized and a second color space coordinate axis perpendicular to the first color space coordinate axis; and the determination target area is set for chrominance image information expressed by the second chrominance pixel values.

An image processing program according to a ninth aspect of the present invention enables a computer to execute processing through the image processing method according to any of the first to eighth aspects.

An image processing apparatus according to a tenth aspect of the present invention comprises: an image input unit that inputs image information; and an execution unit that executes image processing on the input image information input via the image input unit by executing the image processing program according to the ninth aspect.

According to a eleventh aspect of the present invention, in the image processing apparatus according to the tenth aspect, it is preferable that the execution unit comprises; a chrominance image information generation unit that generates chrominance image information based upon the input image information; a determination target area setting unit that sets a determination target area to undergo determination of a target object within a determination target image constituted with the chrominance image information; an average chrominance value calculation unit that calculates an average chrominance value in correspondence to each of the determination target area and a plurality of peripheral areas set around the determination target area, based upon the chrominance image information corresponding to each area; a characteristic color evaluation unit that evaluates color information expressed by the average chrominance value calculated for the determination target area to determine whether or not the color information matches a characteristic color defined in advance in correspondence to the target object; a separate area evaluation unit that evaluates a difference between the average chrominance value in the determination target area and the average chrominance values in the peripheral areas to determine whether or not the determination target area is an image area separate from the peripheral areas; and a determination unit that makes a decision as to whether or not the determination target area contains the target object based upon results of an evaluation indicating whether or not the color information matches the characteristic color and results of an evaluation indicating whether or not the determination target area is a separate image area.

A camera according to a twelfth aspect of the present invention comprises: an image acquisition unit that obtains image information by capturing a subject image; and the image processing apparatus according to the tenth or eleventh aspect, wherein: the image input unit inputs the image information obtained via the image acquisition unit.

Effect of the Invention

According to the present invention, a decision with regard to whether or not a determination target area is an area containing a target object can be made with a high level of accuracy.

BEST MODE FOR CARRYING OUT THE INVENTION

First Embodiment

Figure 1:
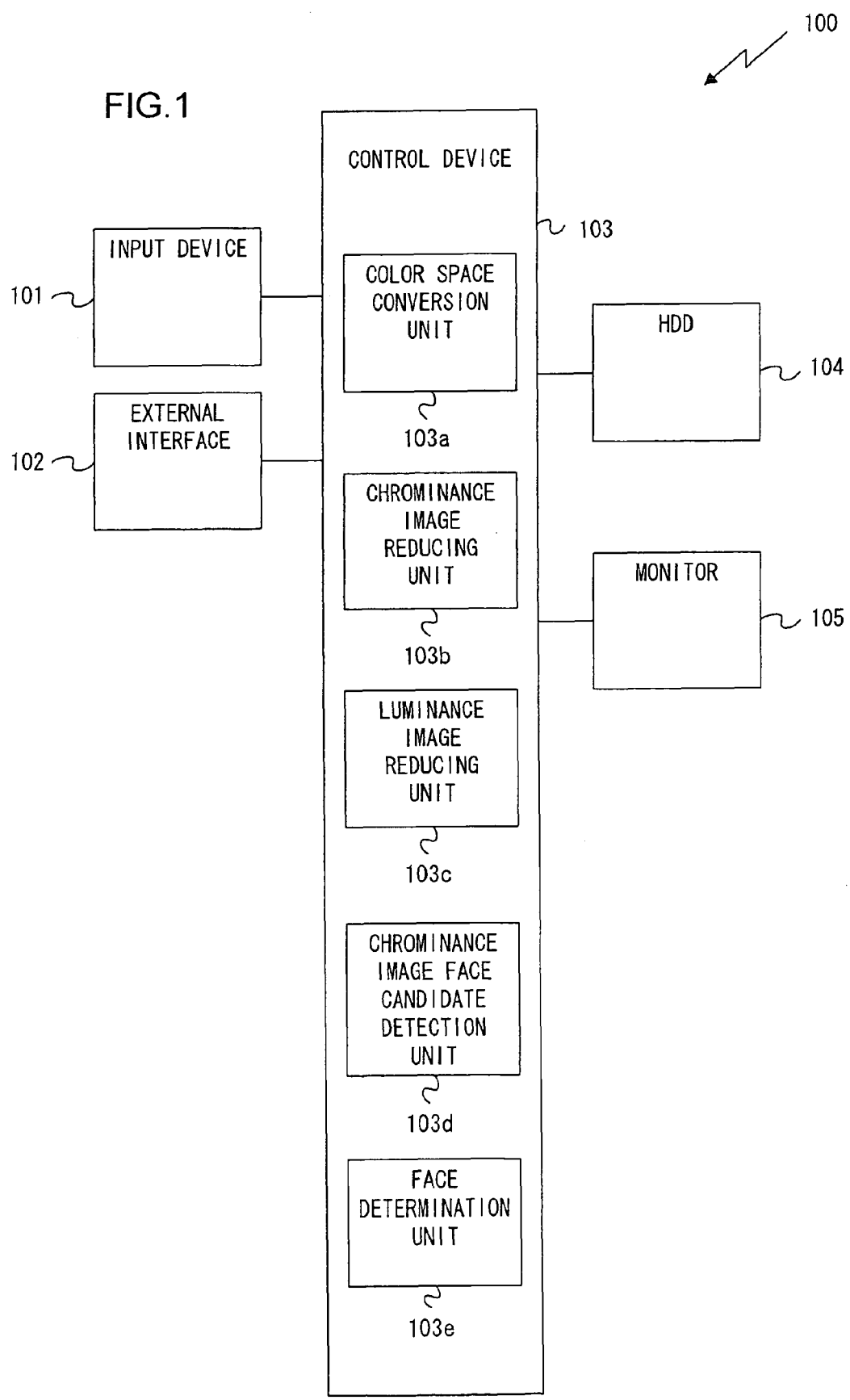
FIG. 1 A block diagram showing the structure adopted in an embodiment of an image processing apparatus FIG. 2 The flow of the processing executed by various units constituting a control device 103

FIG. 1 is a block diagram showing a structure that may be adopted in an image processing apparatus achieved in the first embodiment. The image processing apparatus 100, which may be, for instance, a personal computer, includes an input device 101, an external interface 102, a control device 103, an HDD (hard disk drive) 104 and a monitor 105.

The input device 101 includes various input members operated by the user, such as a keyboard and a mouse. The external interface 102, via which an image processing target image, to be detailed later, is taken in from an external device such as a digital camera, may be, for instance, a USB interface or a wireless LAN interface. The control device 103 constituted with a CPU, a memory and other peripheral circuits, includes a color space conversion unit 103a, a chrominance image reducing unit 103b, a luminance image reducing unit 103c, a chrominance image face candidate detection unit 103d and a face determination unit 103e.

Various types of data including image data taken in via the external interface 102 and an image processing program to be executed by the control device 103 are recorded in the HDD 104. At the monitor 105, an operation screen via which the image processing apparatus 100 is operated, an image recorded in the HDD 104 or the like is brought up on display. It is to be noted that data are recorded into the HDD 104 and a specific display screen is brought up on the monitor 105 under control executed by the control device 103.

Next, the processing executed by the individual units 103a~103e in the control device 103 is explained. Through the processing executed by these units, an area containing a person's face in a given image among those stored in the HDD 104 or an image having been taken in via the external interface 102 is determined. While an area of skin color within the image is detected as a face candidate area in the related art, as explained earlier, a face candidate area cannot be detected accurately from an image with a background containing a color similar to skin color, e.g., when the background behind the person's face is a natural wood wall, since the person's face and the background cannot be distinguished from each other accurately. In addition, if the correct white balance is not achieved while photographing the image, the person's face in the image may take on a color other than skin color, and a face candidate area cannot be detected accurately with ease from such an image, either.

The face candidate area, which is not always detected through the skin color based face candidate detection method in the related art, as described above, can be detected with a high level of accuracy through the method achieved in the embodiment. In reference to FIG. 2, the processing executed by the various units 103a~103e is described.

As the control device 103 reads processing target image data from the HDD 104 or via the external interface 102, an image is input to the color space conversion unit 103a. The color space conversion unit 103a executes color conversion on the input image and generates a chrominance image and a luminance image. It is to be noted that while the color space conversion unit 103a generates the chrominance image and the luminance image by converting the input image to the Lab colorimetric system in the example described here, the present invention is not limited to this example and the input image may instead be converted to another calorimetric system such as the YCbCr calorimetric system. The chrominance image generated by the color space conversion unit 103a is output to the chrominance image reducing unit 103b, whereas the luminance image generated by the color space conversion unit is output to the luminance image reducing unit 103c.

The luminance image reducing unit 103c generates a plurality of reduced luminance images by applying various reduction factors to the luminance image input thereto. For instance, it may generate reduced luminance images obtained by reducing the input luminance image at 32 different reduction factors k expressed as in (1) below in relation to integers n assuming values 0~31.

$$k=0.9^n \quad (1)$$

It is to be noted that the input image may be reduced through, for instance, the variable cubic power operation or the variable linear power operation in the related art. The plurality of reduced luminance images obtained by reducing the input image at various reduction factors as described above are then output to the face determination unit 103e.

The chrominance image reducing unit 103b generates a plurality of reduced chrominance images by applying various reduction factors to the input chrominance image. The reduced chrominance images are generated by the chrominance image reducing unit by reducing the input chrominance image at the 32 different reduction factors k expressed in (1), assuming the same values as those used in the processing executed by the luminance image reducing unit 103c. It is to be noted that the reduced images may be obtained through a method simpler than that adopted in the processing executed by the luminance image reducing unit 103c, such as the "nearest neighbor" method. The plurality of reduced chrominance images obtained by reducing the input image at various reduction factors as described above are then output to the chrominance image face candidate detection unit 103d.

The chrominance image face candidate detection unit 103d executes the face candidate determination processing to be detailed later on each of the plurality of reduced chrominance images input from the chrominance image reducing unit 103b and extracts an area highly likely to contain a person's face in each reduced chrominance image as a face candidate area. If a face candidate area is extracted from at least one of the plurality of reduced chrominance images as a result, information indicating the reduction factor k of the particular reduced chrominance image paired up with the coordinate values (X',Y') of the face candidate area within the reduced chrominance image having been reduced with the reduction factor k, is output to the face determination unit 103e. It is to be noted that the size of the extracted face candidate area is 19×19 pixels, as explained later.

The face determination unit 103e reads the reduced luminance image generated by the luminance image reducing unit 103c at the same reduction factor k as the reduction factor k indicated in the information input from the chrominance image face candidate detection unit 103d. Then, based upon the coordinate values (X',Y') input from the chrominance image face candidate detection unit 103d, it makes a decision as to whether or not the face candidate area does contain a face. The face determination unit 103e makes the decision as to whether or not the face candidate area contains a person's face by executing face determination processing of the known art. Such face determination processing may be executed by adopting any of the methods proposed in the related art such as the neural network method, the SVM method and the AdaBoost method. The face determination processing should be executed through any of these methods on the face candidate area ranging over a 19×19 pixel area within the reduced luminance image. Through this additional processing executed by the face determination unit 103e, the face candidate area having been extracted by the chrominance image face candidate detection unit 103d is reevaluated so as to determine an area containing a person's face with a high level of accuracy.

Upon deciding that the face candidate area in the reduced luminance image contains a person's face, the face determination unit 103e calculates the size S of the person's face relative to the size of the processing target image (input image) and the coordinate values (XY) of the face candidate area in the input image, based upon the size of the person's face, i.e., the size S'=19 of the face candidate area, relative to the reduced image, the coordinate values (X',Y') of the face candidate area in the reduced image and the reduction factor k. More specifically, the size S and the coordinate values are calculated as expressed in (2)~(4) below.

$$S=S'/k \quad (2)$$

$$X=X'/k \quad (3)$$

$$Y=Y'/k \quad (4)$$

The area containing a person's face in the input image is thus identified.

Figure 3:
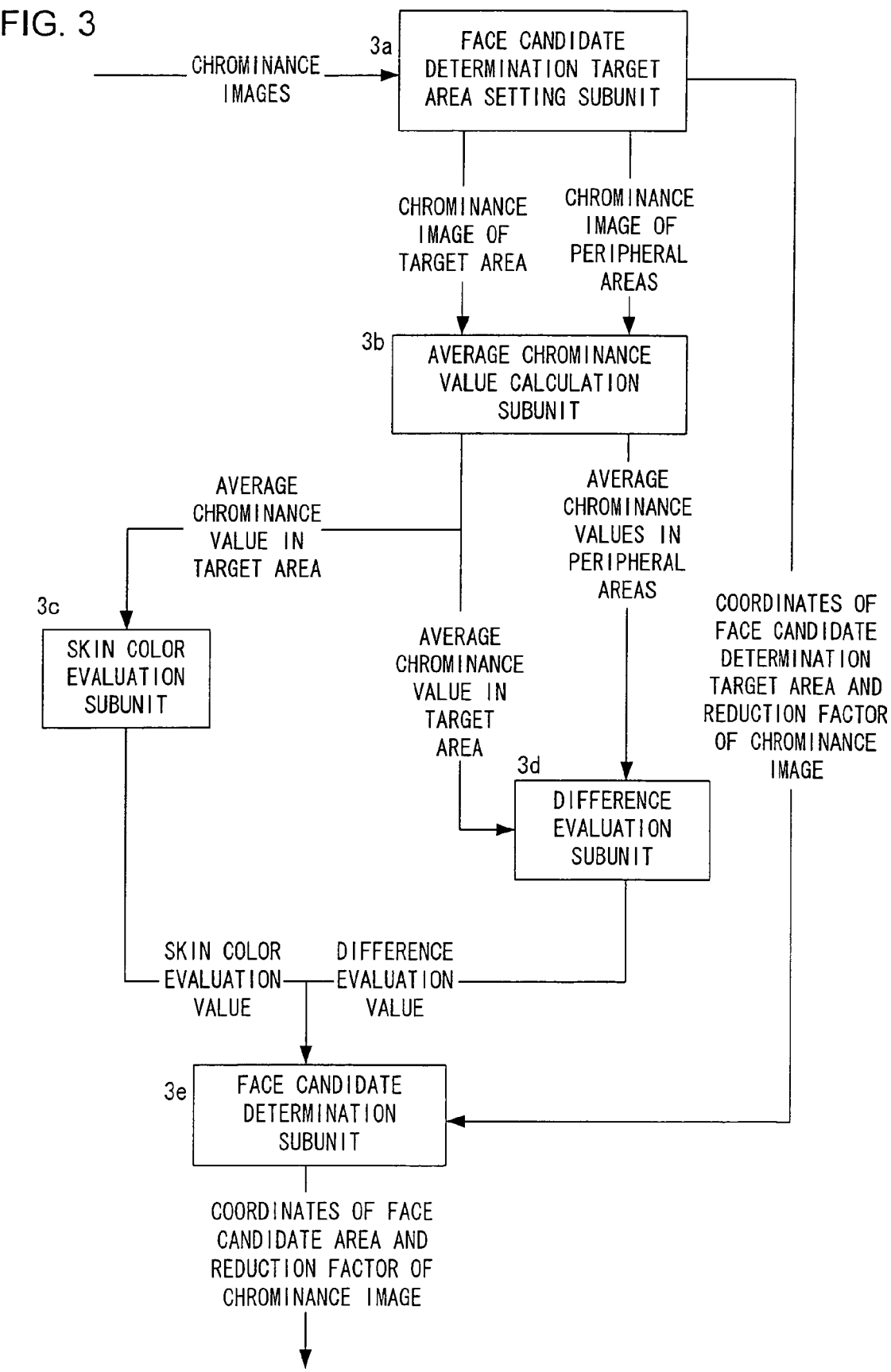
FIG. 3 The flow of the face candidate determination processing executed in a first embodiment FIG. 4 An illustration showing how a face candidate determination target area and peripheral areas may be set FIG. 5 An illustration showing how the parameters used when calculating the skin color evaluation value Es may be set FIG. 6 The flow of the face candidate determination processing executed in a second embodiment FIG. 7 The flow of the face candidate determination processing executed in a third embodiment FIG. 8 An illustration showing how the program may be provided to a personal computer

Next, in reference to FIG. 3, the face candidate determination processing executed by the chrominance image face candidate detection unit 103d is described. The face candidate determination processing executed by the chrominance image face candidate detection unit 103d includes steps executed by various subunits such as a face candidate determination target area setting subunit 3a, an average chrominance value calculation subunit 3b, a skin color evaluation subunit 3c, a difference evaluation subunit 3d and a face candidate determination subunit 3e. The processing executed by each subunit is now described in detail.

The plurality of reduced chrominance images output from the chrominance image reducing unit 103b are input to the face candidate determination target area setting subunit 3a. The face candidate determination target area setting subunit 3a sets face candidate determination target areas in each of the reduced chrominance images. The face candidate determination target areas are set on various lattice points on the reduced chrominance image with the intervals between successive face candidate determination target areas set to approximately 2 pixels. In addition, each face candidate determination target area ranges over approximately a 19×19 pixel area, as explained earlier.

Figure 4:
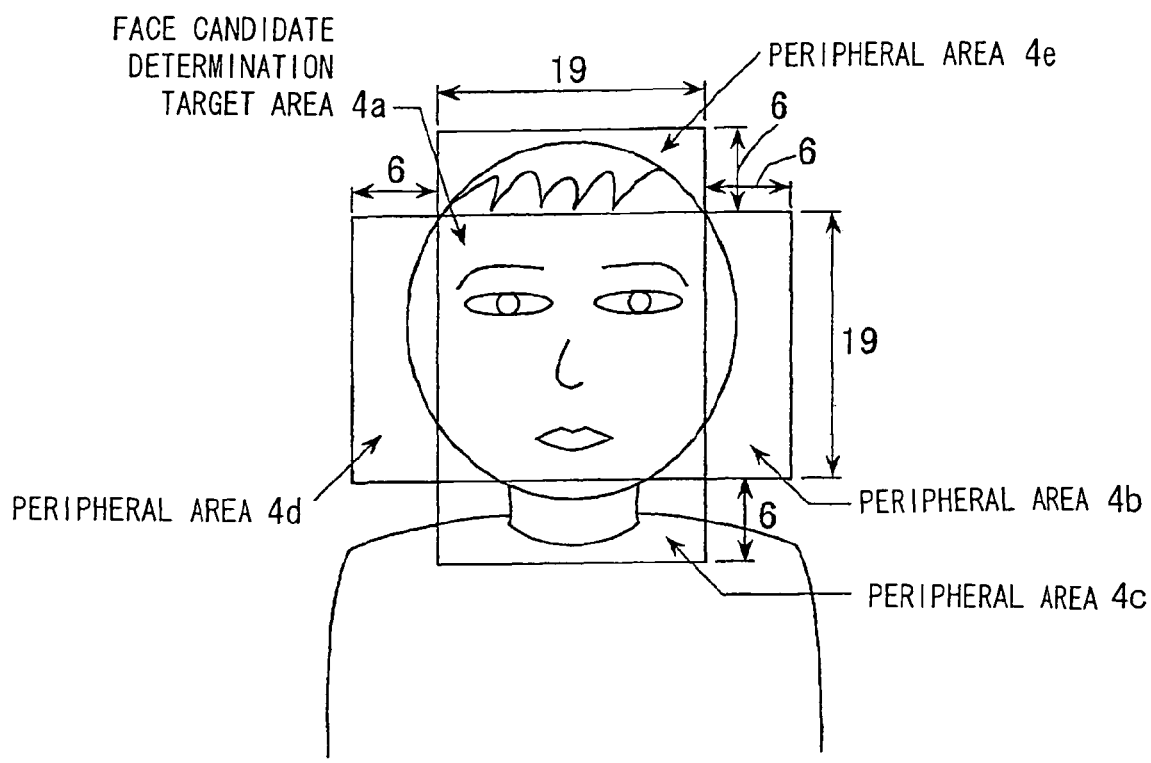

The face candidate determination target area setting subunit 3a also sets peripheral areas ranging on the top side, the bottom side, the left side and the right side of each face candidate determination target area. FIG. 4 illustrates specifically how the peripheral areas may be set. As shown in FIG. 4, a peripheral area 4b is set to the right of a face candidate determination target area 4a, a peripheral area 4c is set on the bottom side of the face candidate determination target area 4a, a peripheral area 4d is set to the left of the face candidate determination target area 4a and a peripheral area 4e is set on the top side of the face candidate determination target area 4a. While the peripheral areas 4b and 4d each range over an area of 6 pixels (across)×19 pixels (down), the peripheral areas 4c and 4e each range over an area of 19 pixels (across)×6 pixels (down).

The average chrominance value calculation subunit 3b calculates the average chrominance value (a*, b*) in each face candidate determination target area, the average chrominance value ($a_1$*, $b_1$*) in the peripheral area 4b, the average chrominance value ($a_2$*, $b_2$*) in the peripheral area 4c, the average chrominance value ($a_3$*, $b_3$*) in the peripheral area 4d and the average chrominance value ($a_4^*$, $b_4^*$) in the peripheral area 4e. It is to be noted that integrated images of the chrominance images may be prepared through preliminary processing executed prior to the face candidate determination processing so as to calculate the average chrominance values quickly.

Namely, an integrated image I (x, y) of a chrominance image C (x, y) may be defined as in (5) below.

$$I(x, y) = \sum_{i=0}^{x} \sum_{j=0}^{y} C(i, j) \quad (5)$$

Csum, obtained by integrating the chrominance image C (x, y) over a rectangular area with the four vertices thereof set at (x, y), (x+w, y), (x, y+h) and (x+w, y+h), is calculated as expressed in (6) below.

$$Csum = I(x+w, y+h) - I(x-1, y+h) - I(x+w, y-1) + I(x-1, y-1) \quad (6)$$

Since the integrated value can be obtained simply through addition/subtraction of the pixel values indicated at the four points, the arithmetic operation can be executed quickly. Then, the average value can be calculated by dividing the integral value Csum for the rectangular area by the number of pixels present in the area.

The skin color evaluation subunit 3c uses the average chrominance value ($a^*$, $b^*$) in the face candidate determination target area 4a for substitution in expressions (7) and (8) below and calculates a skin color evaluation value Es, as expressed in (9). The skin color evaluation value Es, which is an index indicating how close the average chrominance value ($a^*$, $b^*$) in the face candidate determination target area 4a is to skin color, assumes a greater value when the average chrominance value ($a^*$, $b^*$) is closer to skin color.

$$\overline{C}_x = e_{xa}(a^* - a_m) + e_{xb}(b^* - b_m) \quad (7)$$

$$\overline{C}_y = e_{ya}(a^* - a_m) + e_{yb}(b^* - b_m) \quad (8)$$

$$Es = \exp\left(-\frac{\overline{C}_x^2}{2\sigma_x^2} - \frac{\overline{C}_y^2}{2\sigma_y^2}\right) \quad (9)$$

Various parameters $\sigma_x$, $\sigma_y$, $a_m$, $b_m$, $e_{xa}$, $e_{xb}$, $e_{ya}$ and $e_{yb}$ are calculated as described below. Numerous face image samples are collected and the average chrominance value ($a_n$, $b_n$) in a face area in each image is calculated. The average values ($a_n$, $b_n$) may be distributed over, for instance, a shaded area 5a in FIG. 5. The average of the ($a_n$, $b_n$) values is then calculated as ($a_m$, $b_m$). The Cy axis is set along the direction in which the least extent of variance among the ($a_n$, $b_n$) values manifests and the Cx axis is set along the direction perpendicular to the Cy axis. The unit vectors along the Cx axis and the Cy axis are respectively defined as ($e_{xa}$, $e_{xb}$) and ($e_{ya}$, $e_{yb}$).

Then, the standard deviations of the values obtained by projecting the average chrominance value ($a_n$, $b_n$) in the face area in each image along the Cx axis and the Cy axis are determined and then values $\sigma_x$ and $\sigma_y$ are calculated by increasing the standard deviations by approximately 30%. For instance, $\sigma_x$, $\sigma_y$, $a_m$, $b_m$, ($e_{xa}$, $e_{xb}$) and ($e_{ya}$, $e_{yb}$) may be set to, for instance, 16, 8, 12, 20, (0.48, 0.87) and (−0.87, 0.49) respectively, as a result. It is to be noted that the parameters may be calculated through an alternative method such as "principal component analysis", instead of through the method illustrated in FIG. 5.

Based upon the average chrominance value ($a^*$, $b^*$) in the face candidate determination target area 4a and the average chrominance values ($a_1^*$, $b_1^*$)~($a_4^*$, $b_4^*$) corresponding to the peripheral areas 4b~4e, the difference evaluation subunit 3d calculates a difference evaluation value Ed, as expressed in (10)~(14). It is to be noted that the difference evaluation value Ed is an index indicating the difference between the average chrominance value in the face candidate determination target area 4a and the average chrominance values in the individual peripheral areas 4b~4e. When the difference evaluation value Ed assumes a greater value, there is a more significant difference between the average chrominance value in the face candidate determination target area 4a and the average chrominance values in the peripheral areas 4b~4e.

$$Ed = \frac{Ed1 + Ed2 + Ed3 + Ed4}{4} \quad (10)$$

$$Ed1 = 1 - \exp\left(-\frac{(a^* - a_1^*)^2 + (b^* - b_1^*)^2}{\sigma_d^2}\right) \quad (11)$$

$$Ed2 = 1 - \exp\left(-\frac{(a^* - a_2^*)^2 + (b^* - b_2^*)^2}{\sigma_d^2}\right) \quad (12)$$

$$Ed3 = 1 - \exp\left(-\frac{(a^* - a_3^*)^2 + (b^* - b_3^*)^2}{\sigma_d^2}\right) \quad (13)$$

$$Ed4 = 1 - \exp\left(-\frac{(a^* - a_4^*)^2 + (b^* - b_4^*)^2}{\sigma_d^2}\right) \quad (14)$$

$\sigma_d$ in expressions (11)~(14) should be set to, for instance, approximately 5.

The face candidate determination subunit 3e makes a decision as to whether or not the face candidate determination target area 4a is an area that actually contains a person's face, i.e., whether or not the face candidate determination target area 4a is actually a face candidate based upon the skin color evaluation value Es and the difference evaluation value Ed. If the skin color evaluation value Es and the difference evaluation value Ed satisfies the relationship expressed in (15) below, the face candidate determination subunit 3e judges that the face candidate determination target area is a face candidate and determines the particular face candidate determination target area as a face candidate area. It is to be noted that th in expression (15) should be set to, for instance, approximately 0.6

$$0.5 \times Ed + 0.5 \times Es > th \quad (15)$$

Through this method, a face candidate area can be detected accurately even under circumstances in which a face candidate area cannot be detected accurately through the method in the related art from an image photographed without the optimal white balance, an image with a background with a hue close to skin color or the like. Specific examples of determination executed as expressed in (15) are described below in (A)~(E).

(A) When the face candidate determination target area is set over an image of a person's face in an image photographed with the optimal white balance and containing a background with a hue other than skin color:

In this situation, the skin color evaluation value Es and the difference evaluation value Ed assume large values, achieving the relationship expressed in (15). Accordingly, the face candidate determination target area is judged to be a face candidate.

(B) When the face candidate determination target area set on an image of a person's face in an image photographed with the optimal white balance and containing background with a hue close to skin color:

In this situation, the skin color evaluation value Es assumes a large value. In addition, although the background color is similar to skin color, the background color is not exactly the same as the color of the face candidate determination target area. For this reason, the difference evaluation value Ed assumes a somewhat significant value. Accordingly, the relationship expressed in (15) is achieved and the face candidate determination target area is judged to be a face candidate.

(C) When the face candidate determination target area is set over an image of a person's face in an image photographed without the optimal white balance and containing a background with a hue other than skin color:

In this situation, the skin color evaluation value Es may assume a small value. However, since the difference evaluation value Ed assumes a large value, the relationship expressed in (15) is fulfilled. Accordingly, the face candidate determination target area is judged to be a face candidate.

(D) When the face candidate determination target area is set over a wall surface with a hue similar to skin color In this case, the skin color evaluation value Es assumes a large value but the difference evaluation value Ed assumes a value very close to 0. Since the relationship expressed in (15) is not achieved, the face candidate determination target area is judged to be a non-face candidate.

(E) When the face candidate determination target area is set over an object with a hue other than skin color In this situation, the skin color evaluation value Es assumes a value very close to 0. Thus, even if the difference evaluation value assumes a large value, the relationship expressed in (15) is not achieved and the face candidate determination target area is judged to be a non-face candidate.

Upon detecting a face candidate area, the face candidate determination subunit 3e outputs the information indicating the reduction factor k of the reduced chrominance image from which the face candidate area has been detected, paired with the coordinate values (X',Y') of the face candidate area within the reduced chrominance image reduced with the reduction factor k, to the face determination unit 103e.

The following operational effects can be achieved in the first embodiment described above.

(1) The skin color evaluation value Es and the difference evaluation value Ed are calculated and based upon these evaluation values, a decision is made as to whether or not the face candidate determination target area is a face candidate. Thus, a face candidate area containing a person's face can be detected accurately based upon the skin color hue assumed within the face candidate determination target area and the difference between the chrominance values in the face candidate determination target area and the peripheral areas, even from an image in which the face area cannot be distinguished easily through the face detection method in the related art.

(2) Namely, even in an image in which a face candidate area cannot be detected accurately through the method in the related art, e.g., an image photographed without achieving the optimal white balance or containing a background with a skin color hue, a face candidate area can be accurately detected by adopting the embodiment of the invention.

(3) The decision as to whether or not the face candidate determination target area is a face candidate is made by calculating the skin color evaluation value Es and the difference evaluation value Ed and determining whether or not these evaluation values achieve the relationship expressed in (15). In other words, a face candidate area can be detected through a simple system without having to increase the circuit scale or the processing time.

Second Embodiment

The chrominance image face candidate detection unit 103d in the first embodiment described above calculates the skin color evaluation value Es and the difference evaluation value Ed for each face candidate determination target area 4a set on a reduced chrominance image and detects a face candidate area based upon these evaluation values. If the face candidate determination target area 4a contains a red flower and green foliage, the average chrominance value in the face candidate determination target area 4a may be close to that of skin color and, under such circumstances, the face candidate determination target area 4a, which does not contain a person's face, may be erroneously detected as a face candidate area.

Figure 5:
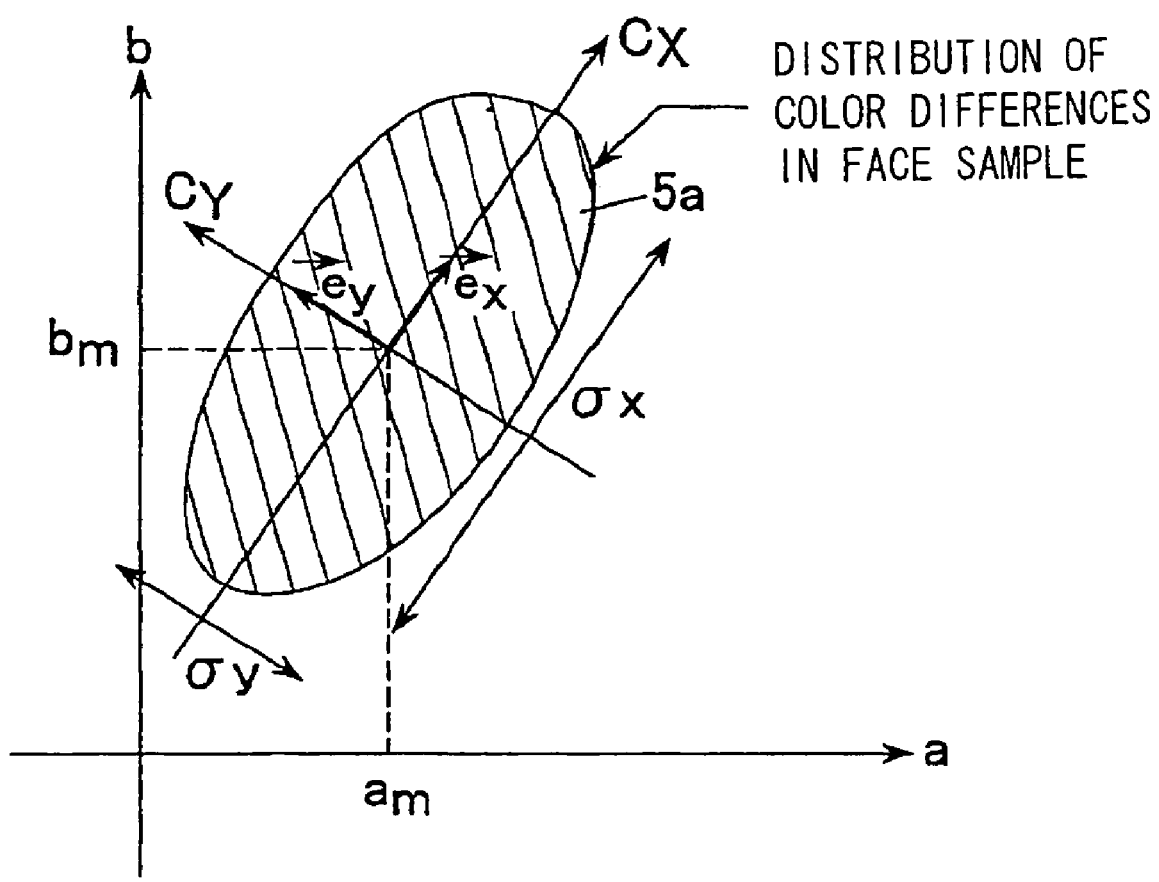

Accordingly, the chrominance image face candidate detection unit 103d in the second embodiment detects a face candidate area in a reduced chrominance image by factoring in the color difference distribution over the face candidate determination target area 4a, in addition to the skin color evaluation value Es and the difference evaluation value Ed. It is to be noted that the block diagram in FIG. 1, the flowchart presented in FIG. 2, the illustration in FIG. 4 showing how a face candidate determination target area and peripheral areas may be set and the method that may be adopted when setting the parameters used to calculate the skin color evaluation value Es, as shown in FIG. 5, having been referred to in the description of the first embodiment, all apply to the second embodiment, as well.

Figure 6:
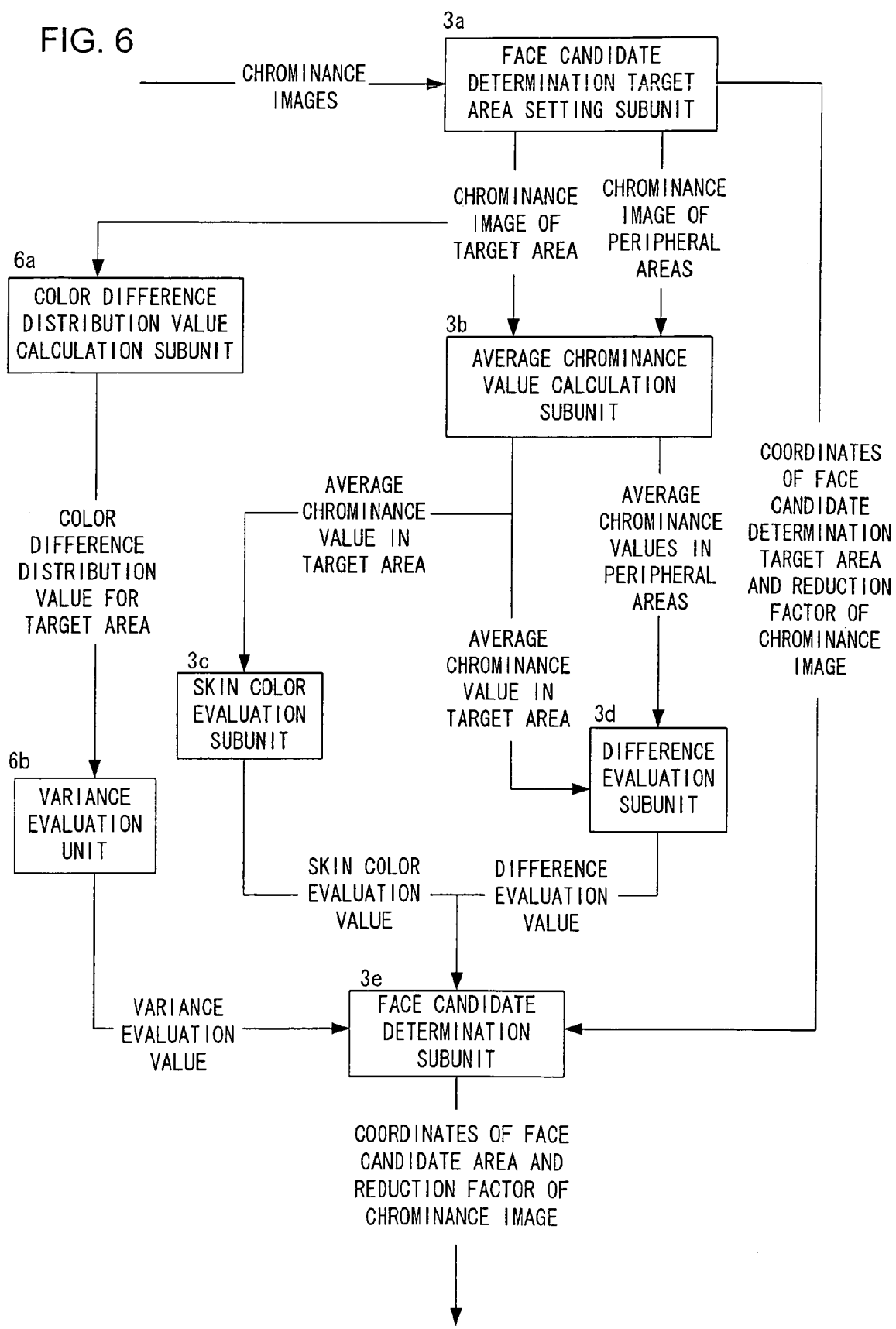

FIG. 6 presents a flowchart of the face candidate determination processing executed by the chrominance image face candidate detection unit 103d in the second embodiment. The face candidate determination processing executed by the chrominance image face candidate detection unit 103d in the second embodiment includes steps executed by various subunits such as a face candidate determination target area setting subunit 3a, an average chrominance value calculation subunit 3b, a skin color evaluation subunit 3c, a difference evaluation subunit 3d, a face candidate determination subunit 3e, a color difference distribution value calculation subunit 6a and a variance evaluation subunit 6b. It is to be noted that the processing executed by the face candidate determination target area setting subunit 3a, the average chrominance value calculation unit 3b, the skin color evaluation subunit 3c and the difference evaluation subunit 3d, which is identical to that executed in the first embodiment, is not described repeatedly.

The color difference distribution value calculation subunit 6a calculates values indicating extents of color difference distribution (color difference distribution values) in the face candidate determination target area 4a. It then calculates a variance evaluation value Eb, as expressed in (16) below based upon $\sigma_a^2$ and $\sigma_b^2$ representing the calculated color difference distribution values. The variance evaluation value Eb, used as an index when evaluating the color difference distribution values calculated for the face candidate determination target area 4a, takes on a larger value when the color difference distribution values calculated for the face candidate determination target area 4a are smaller.

$$Ed = \exp\left(-\frac{\sigma_a^2 + \sigma_b^2}{D^2}\right) \quad (16)$$

D in the expression above may assume a value of, for instance, 10.

It is to be noted that the color difference distribution value can be calculated quickly by creating in advance an integrated image of the chrominance image and a pixel-value squared integrated image of the chrominance image in preliminary processing executed prior to the face candidate determination processing.

The face candidate determination subunit 3e makes a decision as to whether or not the face candidate determination target area is an area that actually contains a person's face, i.e., whether or not the face candidate determination target area is actually a face candidate based upon the skin color evaluation value Es, the difference evaluation value Ed and the variance evaluation value Eb. If the skin color evaluation value Es, the difference evaluation value Ed and the variance valuation value Eb achieves the relationship expressed in (17) below, the face candidate determination subunit 3e judges that the face candidate determination target area is a face candidate and determines the particular face candidate determination target area as a face candidate area. It is to be noted that th in expression (17) should be set to, for instance, approximately 0.6

$$0.4 \times Ed + 0.4 \times Es + 0.2 \times Eb > th \quad (17)$$

Since the decision as to whether or not the face candidate determination target area is a face candidate is made by factoring in the variance evaluation value Eb in addition to the skin color evaluation value Es and the difference evaluation value Ed, a face candidate determination target area 4a that does not contain a person's face can be judged to be a non-face candidate based upon expression (17) even when the average chrominance in the face candidate determination target area 4a is close to skin color, since the variance evaluation value Eb assumes a small value.

Upon detecting a face candidate area, the face candidate determination subunit 3e outputs the information indicating the reduction factor k of the reduced chrominance image from which the face candidate area has been detected, paired with the coordinate values (X',Y') of the face candidate area within the reduced chrominance image reduced with the reduction factor k, to the face determination unit 103e.

The second embodiment described above achieves the following operational effects in addition to those of the first embodiment. Namely, since a face candidate area is detected by factoring in the variance evaluation value Eb in addition to the skin color evaluation value Es and the difference evaluation value Ed, a face candidate determination target area 4a that does not contain a person's face but assumes an average chrominance values close to that of skin color can be accurately judged to be a non-face candidate. In short, an even higher level of accuracy is assured in the face candidate area detection.

Third Embodiment

The reliability of the skin color evaluation value Es described in reference to the first and second embodiments may be compromised when the image is mostly detected as a skin-colored area, e.g., when the color temperature of the light illuminating the subject is low or the background contains a natural wood wall or the like. Accordingly, the accuracy of the face candidate determination is improved in the third embodiment by giving more weight to the difference evaluation value Ed over the skin color evaluation value Es under such circumstances.

Figure 2:
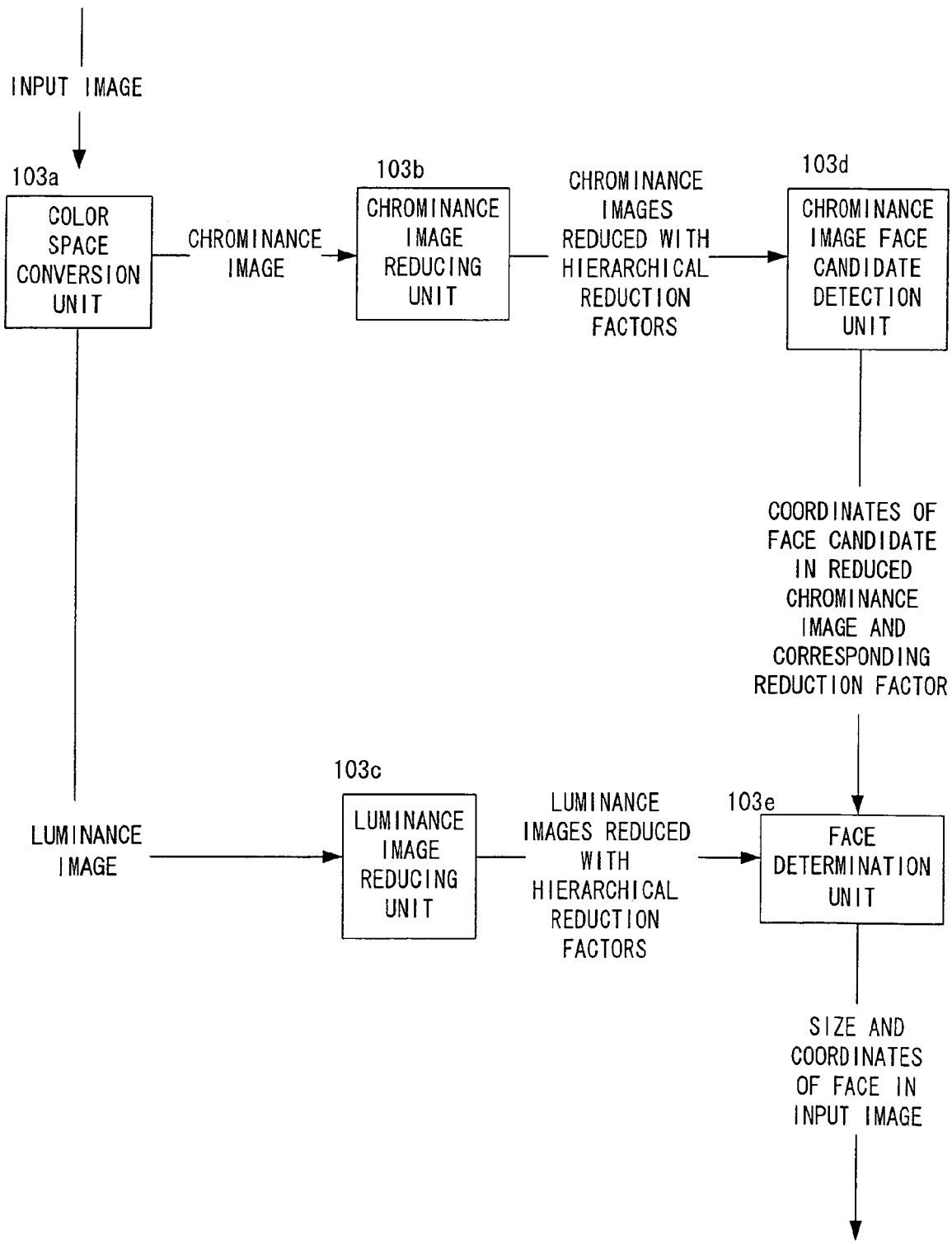

It is to be noted that the block diagram in FIG. 1, the flowchart presented in FIG. 2, the illustration in FIG. 4 showing how a face candidate determination target area and peripheral areas may be set and the method that may be adopted when setting the parameters used to calculate the skin color evaluation value Es, as shown in FIG. 5, having been referred to in the description of the first embodiment, all apply to the third embodiment as well.

Figure 7:
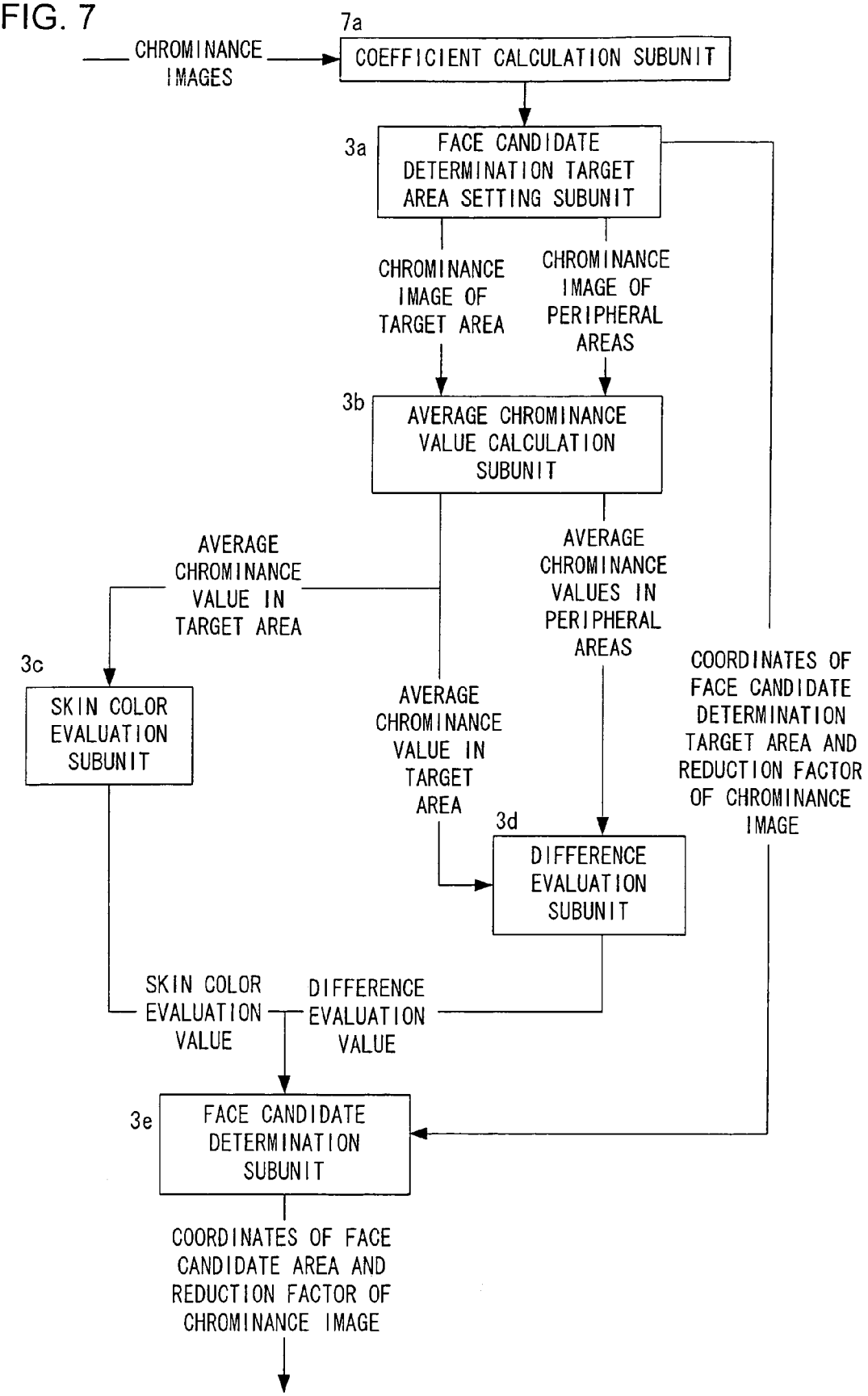

FIG. 7 presents a flowchart of the face candidate determination processing executed by the chrominance image face candidate detection unit 103d in the third embodiment. The face candidate determination processing executed by the chrominance image face candidate detection unit 103d in the third embodiment includes steps executed by various subunits such as a coefficient calculation subunit 7a, a face candidate determination target area setting subunit 3a, an average chrominance value calculation subunit 3b, a skin color evaluation subunit 3c, a difference evaluation subunit 3d and a face candidate determination subunit 3e. It is to be noted that the processing executed by the face candidate determination target area setting subunit 3a, the average chrominance value observation unit 3b, the skin color evaluation subunit 3c and the difference evaluation subunit 3d, which is identical to that executed in the first and second embodiments, is not described repeatedly.

The coefficient calculation subunit 7a determines the ratio of color similar to skin color in the reduced chrominance image, and calculates a coefficient k indicating the extent to which the difference evaluation value Ed is to be taken into account based upon the calculated ratio. More specifically, it divides the reduced chrominance image into blocks each made up with a plurality of pixels, e.g., a few hundred pixels, and calculates an average chrominance value in correspondence to each block. It then counts blocks each indicating an average chrominance value close to that of skin color and calculates the ratio p of the blocks taking on hues similar to skin color, relative to the total number of blocks making up the reduced chrominance image.

The decision as to whether or not a given block has a hue similar to skin color is made based upon the skin color evaluation value Es, which may be calculated by incorporating the average chrominance value corresponding to the block in expressions (7)~(9) for substitution. If the skin color evaluation value Es is equal to or greater than 0.4, the block should be judged to be similar to skin color. In addition, the ratio p of blocks similar to skin color may be calculated for one of the reduced chrominance images reduced with varying reduction factors and this ratio p may be used commonly in conjunction with the other reduced chrominance images. The coefficient calculation subunit 7a calculates the coefficient k indicating the extent to which the difference evaluation value Ed is to be taken into account as expressed in (18) below by using the ratio p thus calculated.

$$k = 0.5 + p/2 \quad (18)$$

The face candidate determination subunit 3e makes a decision as to whether or not the face candidate determination target area is an area that actually contains a person's face, i.e., whether or not the face candidate determination target area is actually a face candidate based upon the skin color evaluation value Es, the difference evaluation value Ed and the coefficient k indicating the extent to which the difference evaluation value Ed is to be taken into account. If the skin color evaluation value Es, the difference evaluation value Ed and the coefficient k indicating the extent to which the difference evaluation value Ed is to be taken into account achieves the relationship expressed in (19) below, the face candidate determination subunit 3e judges that the face candidate determination target area is a face candidate and determines the particular face candidate determination target area as a face candidate area. It is to be noted that th in expression (19) should be set to, for instance, approximately 0.6.

$$k \times Ed + (1-k) \times Es > th \qquad (19)$$

Since the decision as to whether or not the face candidate determination target area is a face candidate is made based upon the coefficient k indicating extent to which the difference evaluation value Ed is to be taken into account and used to weight the skin color evaluation value Es and the difference evaluation value Ed, as described above, the face candidate determination can be executed more accurately even when most of the image is detected as a skin-colored area, e.g., even when the color temperature of the light illuminating the subject is low, even when the background contains a natural wood wall, or the like.

Upon detecting a face candidate area, the face candidate determination subunit 3e outputs the information indicating the reduction factor k of the reduced chrominance image from which the face candidate area has been detected, paired with the coordinate values (X',Y') of the face candidate area within the reduced chrominance image reduced with the reduction factor k, to the face determination unit 103e.

In the third embodiment described above, the decision as to whether or not the face candidate determination target area is a face candidate is made by weighting the skin color evaluation value Es and the difference evaluation value Ed with the coefficient k indicating the extent to which the difference evaluation value Ed is to be taken into account. Thus, in addition to the advantages of the first and second embodiments, a further advantage is achieved in that the face candidate determination processing can be executed with even better accuracy since the decision as to whether or not the face candidate determination target area is a face candidate is made by giving more weight to the difference evaluation value Ed over the skin color evaluation value Es when colors similar to skin color are present over a large range within the image.

Fourth Embodiment

The color space conversion unit 103a in the first through third embodiments generates a chrominance image and a luminance image through color conversion executed on the input image and then outputs the images thus generated to the chrominance image reducing unit 103b and the luminance image reducing unit 103c. After generating the chrominance image and the luminance image through color conversion executed on the input image, the color space conversion unit 103a in the fourth embodiment further converts the chrominance image to an image in a color space optimal for skin color evaluation by the chrominance image face candidate detection unit 103d and then outputs the converted chrominance image to the chrominance image reducing unit 103b.

It is to be noted that the block diagram in FIG. 1, the flowchart presented in FIG. 2, the flowchart of the face candidate determination processing presented in FIG. 3, the illustration in FIG. 4 showing how a face candidate determination target area and peripheral areas may be set and the method that may be adopted when setting the parameters used to calculate the skin color evaluation value Es, as shown in FIG. 5, having been referred to in the description of the first embodiment, all apply to the fourth embodiment, as well. In addition, the processing executed by the individual units, as shown in FIG. 2, other than the color space conversion unit 103a and the chrominance image face candidate detection unit 103d, is identical to that executed in the first through third embodiments and accordingly, the following explanation focuses on the aspects of the processing different from the first through third embodiments.

The color space conversion unit 103a converts the pixel values indicated at the pixels constituting the input image to data in the Lab calorimetric system and further converts the chrominance value (a, b) corresponding to each pixel to a second chrominance value (Cx, Cy) by incorporating the chrominance value (a, b) in expressions (20) and (21) below for substitution.

$$C_x = e_{xa}(a - a_m) + e_{xb}(b - b_m) \qquad (20)$$

$$C_y = e_{ya}(a - a_m) + e_{yb}(b - b_m) \qquad (21)$$

The color space conversion unit 103a then outputs a chrominance image assuming pixel values indicated by the second chrominance values (Cx, Cy) calculated as described above to the chrominance image reducing unit 103b.

In reference to FIG. 3, the face candidate determination processing executed by the chrominance image face candidate detection unit 103d is described. It is to be noted that the processing executed in the fourth embodiment by the face candidate determination target area setting subunit 3a and the face candidate determination subunit 3e in the chrominance image face candidate detection unit 103d is identical to that executed in the first embodiment and accordingly, a repeated explanation is not provided.

The average chrominance value calculation subunit 3b individually calculates a second average chrominance (Cx*, Cy*) for the face candidate determination target area 4a, a second average chrominance (Cx$_1$*, Cy$_1$*) for the peripheral area 4b, a second average chrominance (Cx$_2$*, Cy$_2$*) for the peripheral area 4c, a second average chrominance (Cx$_3$*, Cy$_3$*) for the peripheral area 4d and a second average chrominance (Cx$_4$*, Cy$_4$*) for the peripheral area 4e.

The skin color evaluation subunit 3c calculates the skin color evaluation value Es by incorporating the second average chrominance (Cx*, Cy*) in the face candidate determination target area 4a in expression (22) below for substitution. It is to be noted that the individual parameters in expression (22) should be set in a manner similar to that described in reference to the first embodiment.

$$Es = \exp\left(-\frac{C_x^{*2}}{2\sigma_x^2} - \frac{C_y^{*2}}{2\sigma_y^2}\right) \qquad (22)$$

Based upon the second average chrominance (Cx*, Cy*) in the face candidate determination target area 4a and the second average chrominance (Cx$_1$*, Cy$_1$*)~(Cx$_4$*, Cy$_4$*) corresponding to the peripheral areas 4b~4e, the difference evaluation subunit 3d calculates a difference evaluation value Ed, as expressed in (23)~(27).

$$Ed = \frac{Ed1 + Ed2 + Ed3 + Ed4}{4} \qquad (23)$$

$$Ed1 = 1 - \exp\left(-\frac{(C_x^* - C_{x1}^*)^2 + (C_y^* - C_{y1}^*)^2}{\sigma_d^2}\right) \qquad (24)$$

$$Ed2 = 1 - \exp\left(-\frac{(C_x^* - C_{x2}^*)^2 + (C_y^* - C_{y2}^*)^2}{\sigma_d^2}\right) \qquad (25)$$

$$Ed3 = 1 - \exp\left(-\frac{(C_x^* - C_{x3}^*)^2 + (C_y^* - C_{y3}^*)^2}{\sigma_d^2}\right) \quad (26)$$

$$Ed4 = 1 - \exp\left(-\frac{(C_x^* - C_{x4}^*)^2 + (C_y^* - C_{y4}^*)^2}{\sigma_d^2}\right) \quad (27)$$

$\sigma_d$ in expressions (23)~(27) should be set to, for instance, approximately 5.

The color space conversion unit 103a in the fourth embodiment described above converts the chrominance image to data in the color space optimal for the skin color evaluation and, as a result, the processing load on the chrominance image face candidate detection unit 103d as it calculates the skin color evaluation value Es is reduced.

Variations

The image processing apparatuses achieved in the embodiments described above make the following variations possible.

(1) The face candidate determination processes executed in each of the second, third and fourth embodiments are variations of that executed in the first embodiment. The face candidate determination processing may instead be executed by adopting the first, third and fourth embodiments in combination.

(2) The image processing apparatus 100 is constituted with a personal computer in each of the first through fourth embodiments described above. However, the present invention is not limited to this example and it may be adopted to detect an area containing a person's face in an image photographed via a digital camera equipped with the image processing apparatus 100.

(3) In the first through fourth embodiments, a person's face contained in an image is detected by evaluating the level of similarity to skin color based upon the skin color evaluation value Es. In other words, the determination target is a person's face and the similarity to skin color characterizing the person's face (characteristic color) is evaluated based upon the skin color evaluation value Es in the examples described above. However, the present invention may also be adopted in conjunction with another target object assuming a different characteristic color. Namely, the image processing apparatus 100 may execute a chrominance image generation step in which a chrominance image is generated based upon an input image, an area setting step in which a determination target area to undergo target object determination is set in the chrominance image, an average chrominance value calculation step in which an average chrominance value is calculated in correspondence to the determination target area and each of a plurality of peripheral areas set around the determination target area, a color evaluation step in which the average chrominance value calculated for the determination target area is evaluated to determine whether or not the average chrominance value indicates a characteristic color set in advance in correspondence to the target object, a difference evaluation step in which the difference between the average chrominance value in the determination target area and the average chrominance values in the peripheral areas is evaluated to determine whether or not the determination target area is an image area separate from the peripheral areas and a determination step in which a decision is made as to whether or not the determination target area contains the target object based upon the results of the evaluation executed in the color evaluation step and the results of the evaluation executed in the difference evaluation step, so as to detect the target object present in the image by evaluating the characteristic color of the target object in the image based upon an index equivalent to the skin color evaluation value Es.

Figure 8:
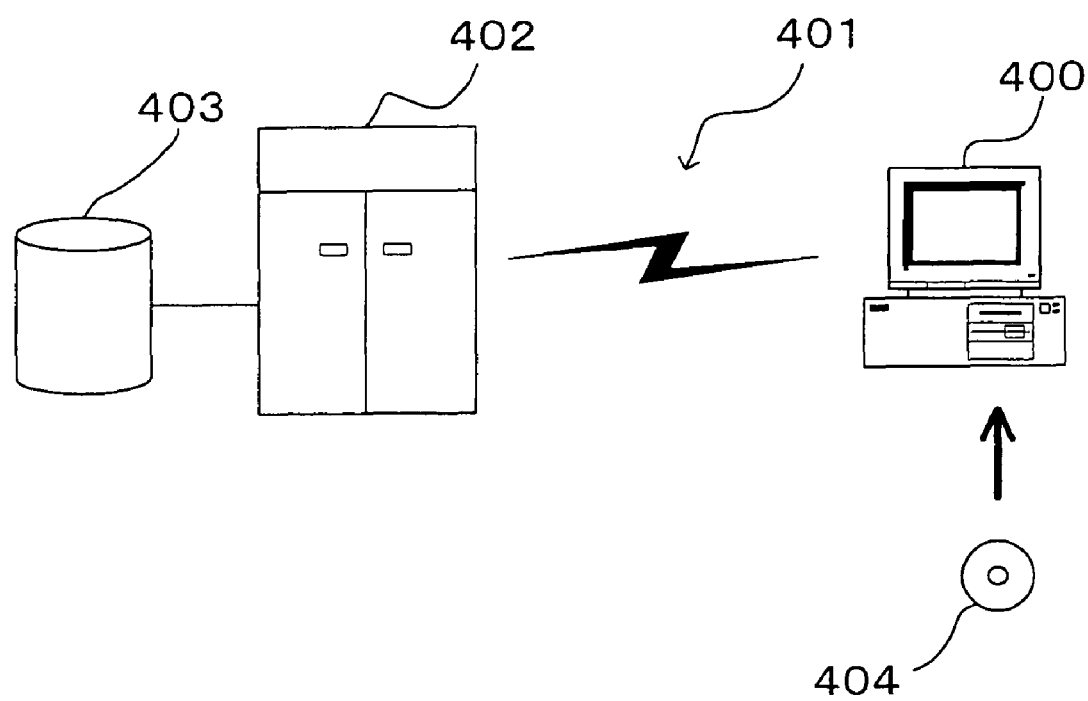

(4) In addition, when the present invention is adopted in a personal computer or the like, the program related to the control described above may be provided to the personal computer via a recording medium such as a CD-ROM or via data signals exchanged on the Internet or the like. FIG. 8 illustrates how the program may be provided through such media. A personal computer 400 receives the program via a CD-ROM 404. The personal computer 400 also has a connection capability to connect with a communication line 401. A computer 402 is a server computer that provides the program stored in a recording medium such as a hard disk 403. The communication line 401 may be a communication network such as the Internet or it may be a dedicated communication network. The computer 402 reads out the program from the hard disk 403 and transmits the program thus read out to the personal computer 400 via the communication line 401. Namely, the program may be embodied as a data signal on a carrier wave and transmitted via the communication line 401. In short, the program can be distributed as a computer-readable computer program product assuming any of various modes such as a recording medium and a data signal.

While the invention has been particularly shown and described with respect to preferred embodiments and variations thereof by referring to the attached drawings, the present invention is not limited to these examples and it will be understood by those skilled in the art that various changes in form and detail may be made therein without departing from the scope and teaching of the invention.

The disclosure of the following priority application is herein incorporated by reference:

Japanese Patent Application No. 2006-202313 filed Jul. 25, 2006

The invention claimed is:

1. An image processing method performed by a processor, the method comprising the steps of:

generating chrominance image information based upon input image information;

setting a determination target area to undergo determination of a target object within a determination target image constituted with the chrominance image information;

calculating an average chrominance value for each of the determination target area and a plurality of peripheral areas set around the determination target area, based upon the chrominance image information corresponding to each area;

evaluating color information expressed by the average chrominance value calculated for the determination target area to determine whether or not the color information matches a characteristic color defined in advance in correspondence to the target object;

evaluating a difference between the average chrominance value in the determination target area and the average chrominance values in the peripheral areas to determine whether or not the determination target area is an image area separate from the peripheral areas; and making a decision as to whether or not the determination target area contains the target object based upon results of an evaluation indicating whether or not the average chrominance value in the determination target area matches the characteristic color and the result of an evaluation indicating whether or not the determination target area is an image area separate from the peripheral areas, wherein at least one of the steps is performed by the processor.

2. An image processing method according to claim 1, wherein:

the target object is a person's face.

3. An image processing method according to claim 2, wherein:

information indicating the characteristic color of the target object is color information indicating skin color of the person's face.

4. An image processing method according to claim 1, wherein:

a color difference distribution in the determination target area is evaluated based upon the chrominance image information corresponding to the determination target area; and a decision is made as to whether or not the determination target area contains the target object based upon the results of the evaluation indicating whether or not the average chrominance value in the determination target area matches the characteristic color, the results of the evaluation indicating whether or not the determination target area is an image area separate from the peripheral areas and results of an evaluation indicating the color difference distribution.

5. An image processing method according to claim 1, wherein:

integrated image information is generated by integrating the chrominance image information and the average chrominance value is calculated based upon the integrated image information.

6. An image processing method according to claim 1, wherein:

a ratio of an area within the determination target image, containing color information corresponding to information indicating the characteristic color of the target object, is calculated; and the decision is made by giving more weight to the results of the evaluation indicating whether or not the determination target area is an image area separate from the peripheral areas when the calculated areal ratio is greater.

7. An image processing method according to claim 1, wherein:

color information expressed by the average chrominance value in the determination target area is evaluated to determine whether or not the color information matches the characteristic color of the target object, based upon an evaluation value obtained by projecting the average chrominance value in the determination target area along a first color space coordinate axis extending along a direction in which variance of sample chrominance values of the characteristic color obtained in advance is minimized and along a second color space coordinate axis perpendicular to the first color space coordinate axis and then converting individual projected values.

8. An image processing method according to claim 1, wherein:

a first chrominance pixel value is generated based upon an input image and values to be used as second chrominance pixel values, are calculated by projecting the first chrominance pixel value along a first color space coordinate axis extending along a direction in which variance of sample chrominance values of the characteristic color, obtained in advance, is minimized and a second color space coordinate axis perpendicular to the first color space coordinate axis; and the determination target area is set for chrominance image information expressed by the second chrominance pixel values.

9. An image processing program stored in a non-transitory computer-readable medium and enabling a computer to execute processing through the image processing method according to claim 1.

10. An image processing apparatus, comprising:

an image input unit that inputs image information; and an execution unit that executes image processing on the input image information input via the image input unit by executing the image processing program stored in the non-transitory computer-readable medium according to claim 9.

11. An image processing apparatus according to claim 10, wherein:

the execution unit comprises:

a chrominance image information generation unit that generates chrominance image information based upon the input image information;

a determination target area setting unit that sets a determination target area to undergo determination of a target object within a determination target image constituted with the chrominance image information;

an average chrominance value calculation unit that calculates an average chrominance value in correspondence to each of the determination target area and a plurality of peripheral areas set around the determination target area, based upon the chrominance image information corresponding to each area;

a characteristic color evaluation unit that evaluates color information expressed by the average chrominance value calculated for the determination target area to determine whether or not the color information matches a characteristic color defined in advance in correspondence to the target object;

a separate area evaluation unit that evaluates a difference between the average chrominance value in the determination target area and the average chrominance values in the peripheral areas to determine whether or not the determination target area is an image area separate from the peripheral areas; and a determination unit that makes a decision as to whether or not the determination target area contains the target object based upon results of an evaluation indicating whether or not the color information matches the characteristic color and results of an evaluation indicating whether or not the determination target area is a separate image area.

12. A camera, comprising:

an image acquisition unit that obtains image information by capturing a subject image; and the image processing apparatus according to claim 10, wherein:

the image input unit inputs the image information obtained via the image acquisition unit.

* * * * *